United States Patent
Harries et al.

(10) Patent No.: US 6,955,101 B2
(45) Date of Patent: Oct. 18, 2005

(54) GEAR ENGAGEMENT MECHANISMS

(75) Inventors: David Anthony Harries, Stratford upon Avon (GB); Bernhard Boll, Alling (DE); Julian Alistair Buckler, Warwickshire (GB)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 56 days.

(21) Appl. No.: 10/715,995

(22) Filed: Nov. 18, 2003

(65) Prior Publication Data

US 2004/0154419 A1 Aug. 12, 2004

(30) Foreign Application Priority Data

Nov. 19, 2002 (GB) .............................................. 0226934

(51) Int. Cl.[7] .............................................. F16H 59/00
(52) U.S. Cl. ...................................... 74/335; 74/336 R
(58) Field of Search .............................. 74/335, 336 R, 74/337, 471 XY

(56) References Cited

U.S. PATENT DOCUMENTS

| | | | |
|---|---|---|---|
| 3,418,866 A | * 12/1968 | Behr et al. ............... | 74/473.24 |
| 4,781,074 A | * 11/1988 | Long ....................... | 74/473.22 |
| 5,531,133 A | * 7/1996 | Takemura et al. ........ | 74/473.19 |
| 5,836,207 A | 11/1998 | Spooner et al. | |
| 5,992,590 A | 11/1999 | Harries | |

* cited by examiner

Primary Examiner—Roger Pang
(74) Attorney, Agent, or Firm—Michael Best & Friedrich LLP

(57) ABSTRACT

Axially-movable first and second shift rails (70, 72) control engagement of one of a pair of gears (37, 32, 33, 34) coupled thereto. A first shift finger (102) rotates with a drive shaft (110) and is also pivotable thereto. A second shift finger (104) is mounted on the drive shaft so as to be selectively rotatable therewith, and is formed as a bell crank lever (154) having a first limb, which non-removably engages the second shift rail, and a second limb. The first shift finger is pivoted by a solenoid actuator (134) between a disengaged position, in which the first shift finger is clear of the first shift rail and the second limb of the bell crank lever, and an engaged position in which the first shift finger engages the first shift rail or the second limb depending upon the angular orientation, or rotational position, of the first shift finger.

23 Claims, 5 Drawing Sheets

GEAR ENGAGEMENT MECHANISMS

CROSS-REFERENCE

This application claims priority to U.K. patent application no. 0226934.8 filed Nov. 19, 2002, the contents of which are incorporated herein by reference as if fully set forth herein.

TECHNICAL FIELD

The present invention relates to gear engagement mechanisms and more particularly, to gear engagement mechanisms for automatic or semi-automatic transmission systems, which may include, e.g., a multi-ratio gearbox in which gear ratios are engaged using actuators under the control of an electronic control unit.

DISCUSSION OF THE RELATED ART

U.S. Pat. Nos. 5,836,207 and 5,992,590 describe automatic or semi-automatic transmission systems that utilize a gear selection mechanism for a manual gearbox. The movement of a selector means is controlled by a pair of double-acting actuators so to control movement of the selector means in a first direction to select a pair of gear ratios and in a second direction to engage one of the selected pair of gear ratios.

SUMMARY OF THE INVENTION

One object of the present invention is to provide improved gear engagement mechanisms, preferably for use in automatic or semi-automatic transmission systems.

In a first aspect of the present teachings, apparatus for selectively engaging a gear in a transmission are taught. In such apparatus, a first shift finger is pivotably and rotatably coupled to a rotatable drive shaft. A second shift finger and an optional third shift finger may be mounted on the drive shaft for selective engagement and rotation with the drive shaft. In addition, the second shift finger is coupled to a second shift rail and the optional third shift finger is coupled to an optional third shift rail. Each shift rail is coupled to a pair of gears, which may be selected for engagement by axial movement of the respective shift rail.

The first shift finger may be selectively engaged with or coupled to the first shift rail, the second shift finger or the third shift finger. Thus, when the first shift finger engages the first shift rail, the respective gears coupled to the first shift rail can be bought into engagement with opposing gears mounted on an input shaft by selective axial movement of the first shift rail. When the first shift finger is coupled to the second shift finger, the second shift finger rotates with the drive shaft and the second shift rail can be axially moved so as to bring about engagement of the gears coupled to the second shift rail with opposing gears disposed on the input shaft. Similarly, when the first shift finger is coupled to the optional third shift finger, the third shift finger is rotatably coupled to the drive shaft and the third shift rail can be axially moved so as to bring about engagement of the gears coupled to the third shift rail with opposing gears disposed on the input shaft.

In another aspect of the present teachings, brake mechanisms are taught for selectively holding the first, second or third shift rail in a desired position in order to maintain the engagement or selection of the selected gear. Such brake mechanisms optionally can be disposed in a drive path between the drive shaft and a motor that rotatably drives the drive shaft. By utilizing the present brake mechanisms, the rotational position of the drive shaft can be easily maintained without the requirement of supplying power to the motor, thereby reducing energy consumption for operating the present devices.

Additional objects, features and advantages of the present teachings will be readily understood to a person of ordinary skill in the art after reading the following detailed description of examples and embodiments of the present teachings together with the claims and the accompanying drawings.

DETAILED DESCRIPTION OF THE INVENTION

Figure 1:
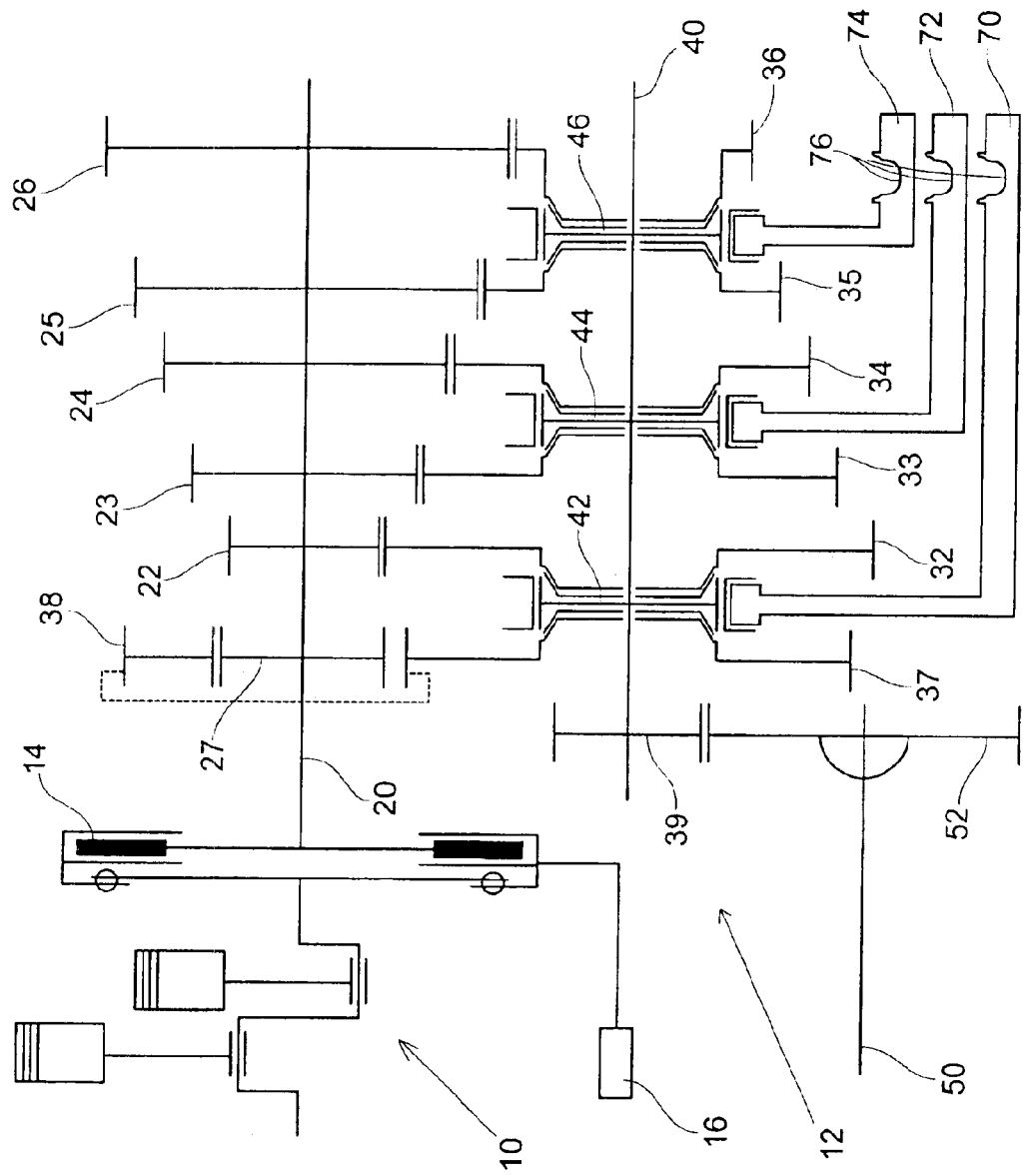
FIG. 1 diagrammatically illustrates a representative gearbox of a motor vehicle.

According to one embodiment of the present teachings, an apparatus for selecting a gear in a transmission may include at least a first shift rail and a second shift rail. Each shift rail is preferably adapted to control engagement of one of a pair of gears by axial movement of the shift rail in one direction or the other. At least a first shift finger and a second shift finger are preferably mounted for rotation on a rotatable drive shaft. The drive shaft preferably extends in a plane that is parallel, or substantially parallel, to the respective axial movement paths of the first and second shift rails. Thus, by selective engagement of the first or second shift rails by the first or second shift finger, the respective shift rails can be axially moved in either direction by rotation of the drive shaft.

Preferably, the first shift finger is mounted for rotation with the drive shaft, and for pivotal movement in a plane parallel to the rotational axis of the drive shaft. In another aspect of the present teachings, the first shift finger is shiftable between a disengaged position, in which the first shift finger is clear of the first shift rail (or a slot coupled to the second shift finger, as will be discussed below), and an engaged position, in which the first finger engages the first shift rail (or the slot coupled to the second shift finger). The second shift finger may be formed as a first limb of a bell crank lever, which first limb permanently or fixedly (non-removably) engages the second shift rail. A second limb of the bell crank lever is selectively engageable with the first shift finger. Thus, the first shift finger may be selectively engaged with the first shift rail or with the second limb of the bell crank lever, depending upon the angular orientation (rotational position) of the first shift finger. This selective engagement determines which pair of gears will be selected.

Further, means may be provided for moving the first shift finger between its engaged and disengaged positions. Such means may include a solenoid actuator coupled to the first shift finger, although persons skilled in the art will readily recognize that various mechanical or electrical devices may be utilized to selectively move (e.g., pivot) the first shift finger between its engaged and disengaged positions. Thus, the present teachings are not particularly limited in this regard.

According to the above-described gear engagement mechanism, the first shift finger may be engaged with the first shift rail in one mode of operation, so that rotation of the first shift finger by the drive shaft will cause axial movement of the first shift rail in either axial direction, depending upon the direction of rotation of the drive shaft. In another mode of operation, the first shift finger may be engaged with the second limb of the bell crank lever, so that rotation of the first shift finger will cause the bell crank lever to rotate, thereby axially moving the second shift finger and thus, the second shift rail.

In an optional embodiment, the above-described gear selecting mechanism may be adapted to operate three or more shift rails. In this case, an additional bell crank lever is preferably provided for each additional shift rail. The second limbs of each additional bell crank lever may be spaced angularly of the second limbs of the other bell crank levers so as to permit selective engagement by the first shift finger by rotating the first shift finger to the appropriate rotational position and then pivoting the first shift finger to engage the appropriate bell crank lever.

According to a further embodiment of the present teachings, a brake mechanism for a rotary drive may include a rotor having a plurality of projections. The projections may be spaced angularly of one another and may include resilient, radially-extending portions and axially-extending portions spaced radially of the rotational axis of the rotor. Masses (e.g., steel balls) may be secured or coupled to the axially-extending portions of the fingers. A stationary or static stator may include an annular plug disposed coaxially of the rotor. The axially-extending portions of the rotor or the masses may be secured to the plug and may frictionally engage an external diameter (surface) of the plug when the rotor is stationary. Preferably, the stator frictionally engages the rotor when the rotational speed of the rotor falls below a threshold value. Above the threshold value (i.e., relatively high-speed rotation of the rotor), the frictional resistance (engagement) reduces to zero, or substantially zero, due to centrifugal loading of the masses.

In a particularly preferred embodiment, the above-described brake mechanism may be mounted on the drive shaft that rotatably supports the first and second shift fingers. The rotor may be fixedly coupled to the rotatable drive shaft and the stator may be non-rotatably mounted adjacent thereto. By utilizing this brake mechanism with the gear engagement mechanisms of the present teachings, a selected gear can be maintained in the engaged state without the need to supply power to the motor that rotatably drives the drive shaft and thereby axially moves the respective shift rails.

Each of the additional features and teachings disclosed below may be utilized separately or in conjunction with other features and teachings to provide improved gear engagement and brake mechanisms and methods for designing and using such gear engagement and brake mechanisms. Representative examples of the present invention, which examples utilize many of these additional features and teachings both separately and in conjunction, will now be described in further detail with reference to the attached drawings. This detailed description is merely intended to teach a person of skill in the art further details for practicing preferred aspects of the present teachings and is not intended to limit the scope of the invention. Moreover, combinations of features and steps disclosed in the following detail description may not be necessary to practice the invention in the broadest sense, and are instead taught merely to particularly describe representative examples of the invention. Further, various features of the representative examples and the dependent claims may be combined in ways that are not specifically and explicitly enumerated in order to provide additional useful embodiments of the present teachings. All features disclosed in the description and/or the claims are intended to be disclosed separately and independently from each other for the purpose of original written disclosure, as well as for the purpose of restricting the claimed subject matter independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In the transmission system illustrated in FIG. 1, a clutch 14, when engaged, transmits torque between the output shaft of engine 10 and an input shaft 20 of a gearbox 12. Engagement of clutch 14 is preferably controlled by clutch slave cylinder 16 in a known manner.

Six gears 22–27 are mounted on input shaft 20 for rotation therewith. Gears 22–26 respectively mesh with gears 32–36. However, gear 27 meshes with gear 37 via an intermediate gear 38. Gears 32–37 are mounted on lay (intermediate) shaft 40 for rotation relative thereto and lay shaft 40 is mounted parallel to, but spaced from, input shaft 20. Gears 32 and 37 may be selectively engaged for rotation with lay shaft 40 by a first synchromesh unit 42. Similarly, gears 33 and 34 may be selectively engaged for rotation with lay shaft 40 by a second synchromesh unit 44 and gears 35 and 36 may be selectively engaged for rotation with lay shaft 40 by a third synchromesh unit 46.

Preferably, gears 22 and 32 are sized so as to provide a first gear ratio; gears 23 and 33 are sized so as to provide a second gear ratio; gears 24 and 34 are sized so as to provide a third gear ratio; gears 25 and 35 are sized so as to provide a fourth gear ratio; and, gears 26 and 36 are sized so as to provide a fifth gear ratio. On the other hand, intermediate gear 38 reverses the direction of rotation so that gears 27 and 37 provide a reverse gear ratio.

Lay shaft 40 is drivingly connected, via gears 39 and 52, to output shaft 50 of gearbox 12.

Naturally, a greater or lesser number of gears may be utilized with the present teachings in order to provide a greater or lesser number of gear ratios. The present teachings are not particularly limited in this regard.

In the representative embodiment, synchromesh units 42, 44, 46 are respectively controlled by shift rails 70, 72, 74. For example, axial movement of shift rails 70, 72, 74 preferably axially moves the synchromesh units 42, 44, 46 with respect to lay shaft 40. In this manner, synchromesh unit 42 (as illustrated in FIG. 1) may be moved to the left to engage gear 37 with lay shaft 40, thereby engaging the reverse gear. In addition, synchromesh unit 42 may be moved to the right to engage gear 32 with lay shaft 40, thereby engaging the first gear. Similarly, synchromesh unit 44 may be moved to the left to engage gear 33 with lay shaft 40, thereby engaging the second gear. In addition, synchromesh unit 44 may be moved to the right to engage gear 34 with lay shaft 40, thereby engaging the third gear. Moreover, synchromesh unit 46 may be moved to the left to engage gear 35 with lay shaft 40, thereby engaging the fourth gear. In addition, synchromesh unit 46 also may be moved to the right to engage gear 36 with lay shaft 40, thereby engaging the fifth gear.

As illustrated in FIG. 1, a notch (recess) 76 is defined in or on each of shift rails 70, 72, 74, which notches 76 are preferably aligned transversely with respect to the shift rails 70, 72, 74 when the synchromesh units 42, 44 and 46 are in a central, neutral position. In other words, in the central, neutral position, none of gear 32-37, which are associated with the respective synchromesh unit 42, 44 and 46, is engaged or fixedly rotatable with lay shaft 40.

Figure 2:
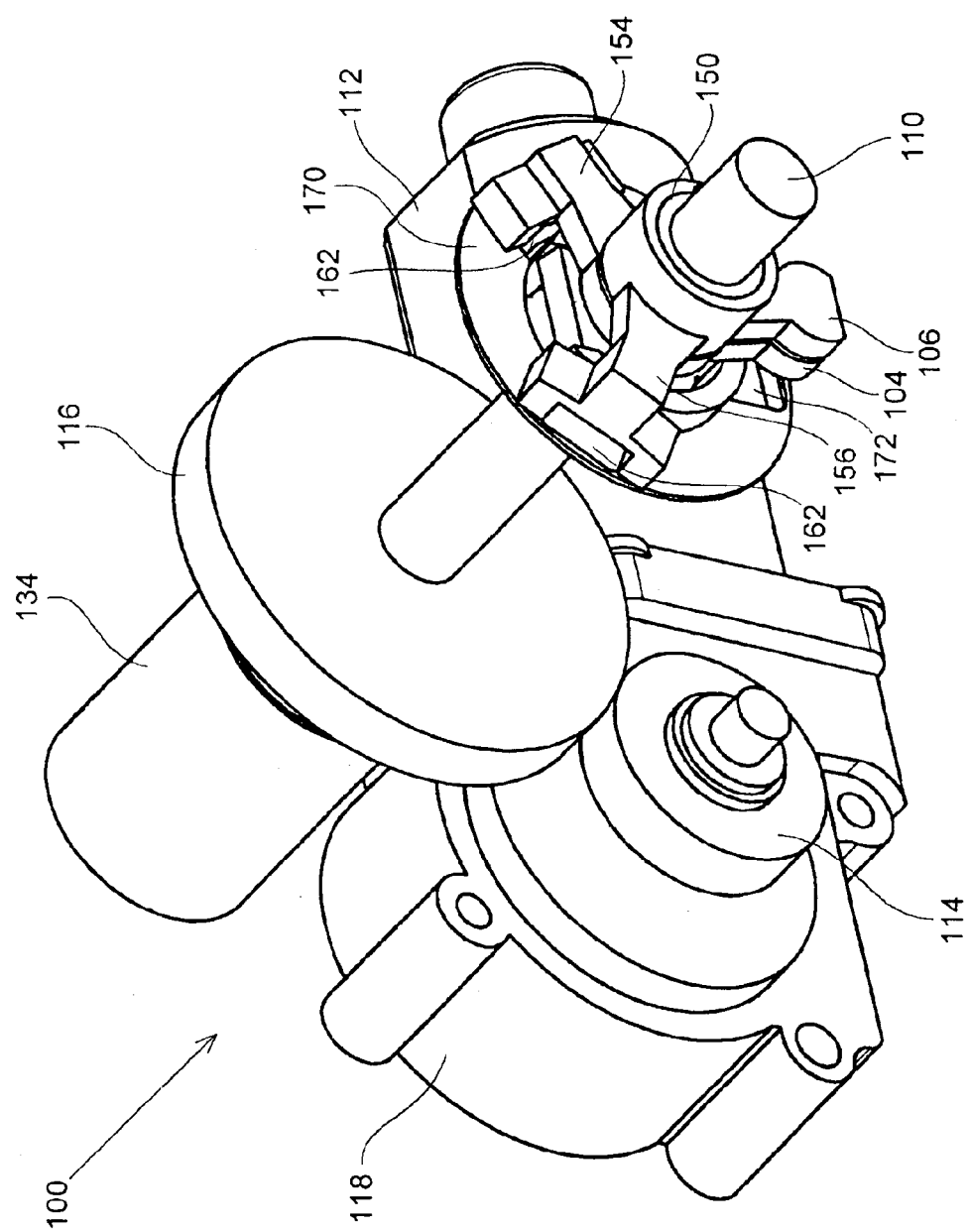
FIG. 2 illustrates a representative gear engagement mechanism for the gearbox shown in FIG. 1.
Figure 3:
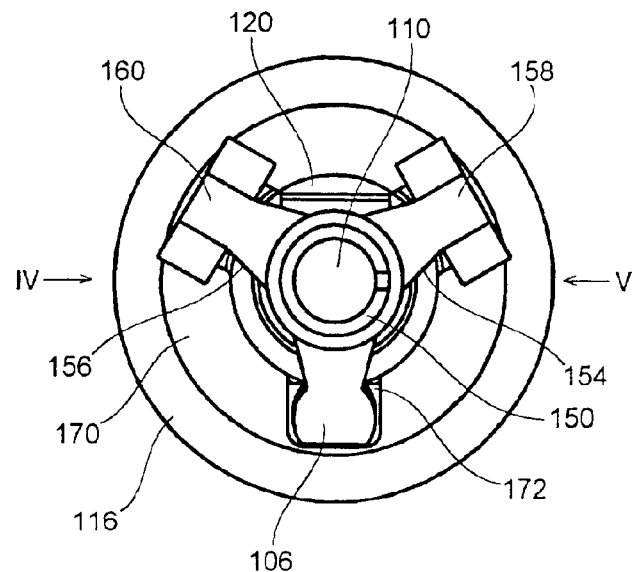
FIG. 3 is an end elevation view of a representative gear selector for the representative engagement mechanism shown in FIG. 2.
Figures 4, 5:
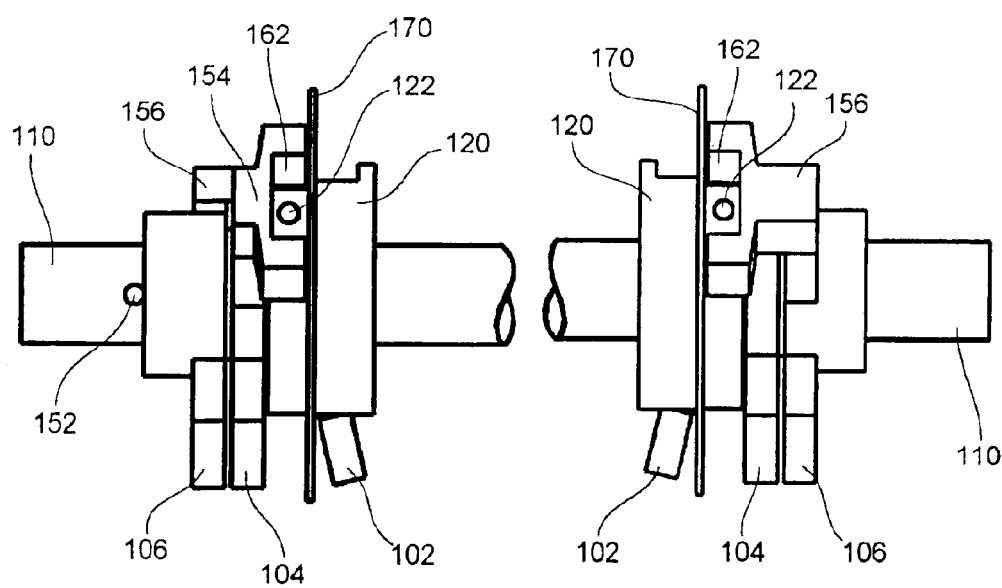
FIG. 4 is a side elevation view of the representative gear selector as viewed in the direction of arrow IV shown in FIG. 3.
FIG. 5 is a side elevation view of the representative gear sector as viewed in the direction of arrow V shown in FIG. 3.
Figure 6:
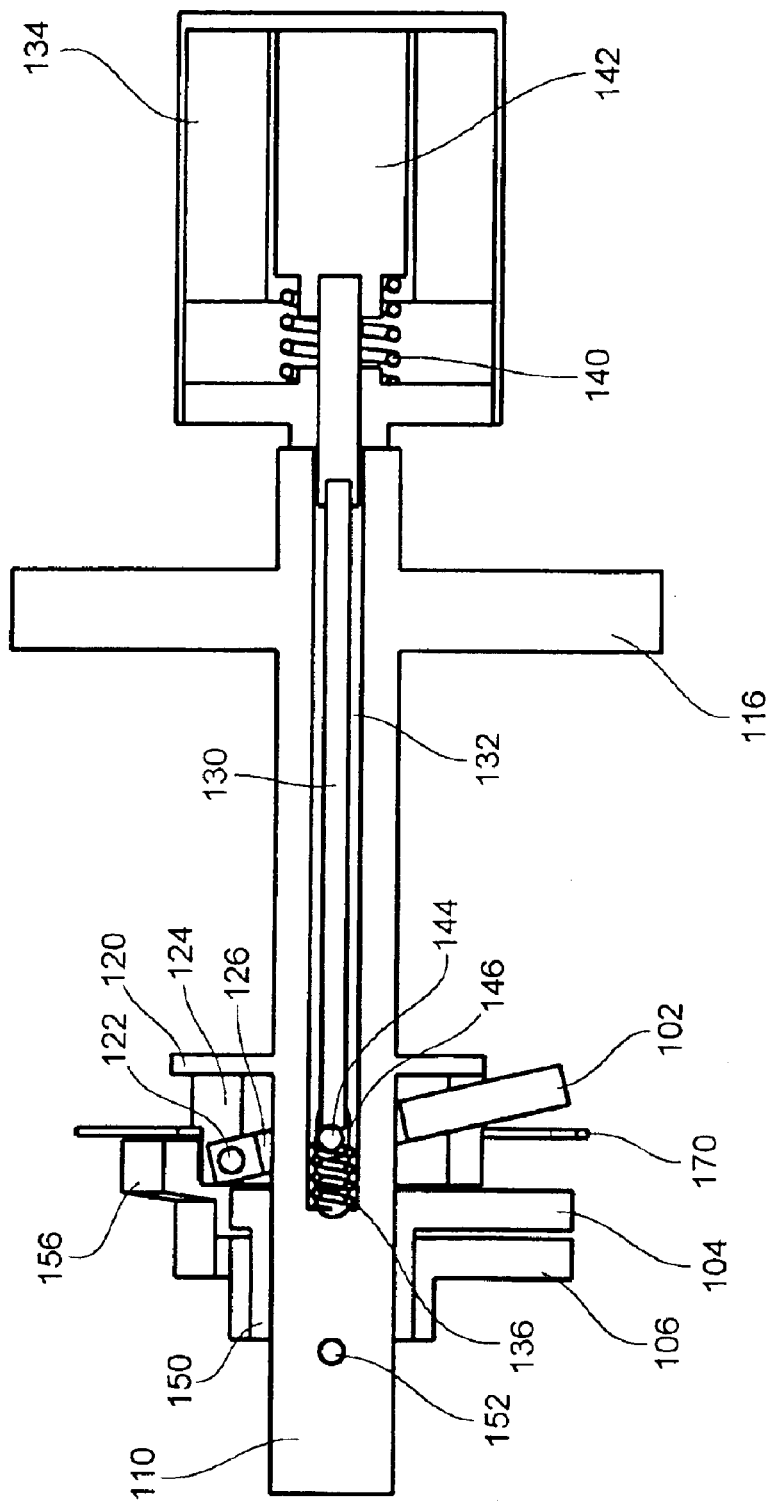
FIG. 6 is a partial, cross-sectional elevation view of the representative gear engagement mechanism illustrated in FIG. 2.

The respective notches 76 of shift rails 70, 72, 74 are preferably engageable by respective shift fingers 102, 104, 106 defined on a gear engagement mechanism 100, as illustrated in greater detail in FIGS. 2–6. Further, shift fingers 102, 104, 106 are preferably mounted on a drive shaft 110, as shown in FIGS. 4–6, and as will be further discussed below. The drive shaft 110 may be drivingly connected to electric motor 112 via gear train 114, 116 and reduction gear box 118, as shown in FIG. 2.

Referring to FIGS. 4-6, shift finger 102 is pivotably mounted via pivot pin 122 to hub 120, which is disposed on drive shaft 110. The longitudinal axis of pivot pin 122 is preferably transverse or substantially perpendicular to the rotational axis of drive shaft 110. Shift finger 102 may be preferably disposed within diametrical slot (recess) 124 defined in hub 120. The drive shaft 110 preferably passes or extends through an elongated aperture 126 defined in shift finger 102, so that the shift finger 102 may be pivoted between a disengaged position, in which shift finger 102 is clear of the notch 76 (as illustrated in FIG. 6), and an engaged position, in which shift finger 102 is oriented substantially vertically and engages the notch 76.

Referring to FIG. 6, push rod 130 is slidably disposed within partially enclosed axial bore 132, which is defined within drive shaft 110. Solenoid actuator 134 is preferably disposed at the open end of bore 132 and biases push rod 130 so to move push rod 130 in the axial direction of drive shaft 110 against the biasing force applied by return spring 136, which acts between the closed end of bore 132 and the adjacent end of push rod 130. The solenoid actuator 134 also preferably includes return spring 140, which biases solenoid plunger 142 to return plunger 142 to the right (as illustrated in FIG. 6) when the solenoid actuator 134 is de-energized or de-activated. Push rod 130 is preferably connected or coupled to shift finger 102 via pivot pin 144, which extends transversely of drive shaft 110 through an axially-extending diametrical slot 146.

Thus, axial movement of push rod 130 will cause shift finger 102 to pivot between its disengaged and engaged positions. Consequently, shift finger 102 is rotatable with drive shaft 110 and can be pivoted along the axial direction of drive shaft 110 between an engaged and disengaged position. As will be discussed further below, shift finger 102 can selectively engage shift rail 70, shift finger 104 or shift finger 106 in its engaged position and engages none of these structures in its disengaged position.

Shift finger 104 is rotatably mounted on drive shaft 110 via bearing 150 and shift finger 106 is rotatably mounted on the external diameter of bearing 150. A pin 152 locates shift fingers 104, 106 axially adjacent to the hub 120.

As indicated by FIG. 3, shift finger 106 permanently or non-removably engages notch 76 defined in shift rail 74. Similarly, shift finger 104 permanently or non-removably engages notch 76 defined in shift rail 72. Shift fingers 104, 106 are respectively defined by one limb of bell crank levers 154, 156. As shown in FIG. 2, an axially-extending slot 162 is defined in each of the other limbs 158, 160 of bell crank levers 154, 156, which slots 162 have similar dimensions as notches 76, because finger 102 is preferably shaped so as to selectively engage notch 76 in shift rail 70, or one of slots 162 in bell crank levers 154, 156.

Limb 158 of bell crank lever 154 is preferably disposed 120° clockwise from shift finger 104; limb 160 of bell crank lever 156 is preferably disposed 240° clockwise from shift finger 106. According to this arrangement, slots 162 of bell crank levers 154 and 156 and notch 76 for shift rail 70 will be spaced angularly at 120° intervals when in the neutral position. The slotted portions of bell crank levers 154 and 156 also may be offset axially from shift fingers 104 and 106, so that slots 162 are aligned axially with the notch 76 in shift rail 70.

A guide plate 170 may be disposed at a fixed axial and rotational position between the engaged and disengaged positions of shift finger 102. As shown in FIGS. 2–3, a plurality of apertures 172 are defined in guide plate 170 at angularly spaced positions corresponding to the positions of notch 76 on shift rail 70, and slots 162, when shift fingers 102, 104 and 106 are in their neutral positions. Preferably, apertures 172 are shaped to permit shift finger 102 to move between its engaged and disengaged positions only when it is accurately aligned with notch 76 in shift rail 70 or one of slots 162 in bell crank levers 154 or 156.

When the above-described mechanism is disposed in its disengaged position, shift finger 102 may be rotated by motor 112 until shift finger 102 is aligned angularly with notch 76 in shift rail 70. Shift finger 102 may then be moved by solenoid actuator 134 into engagement with notch 76 in shift rail 70. Rotation of shift finger 102 by motor 112, in either direction, will then move shift rail 70 axially to actuate synchromesh unit 42 and engage either the first gear or the reverse gear.

In order to control synchromesh unit 44 so as to engage either the second or the third gear, shift finger 102, in its disengaged position, is rotated by motor 112 until shift finger 102 is aligned angularly with slot 162 of bell crank lever 154. Solenoid actuator 134 is then energized (i.e., push rod 130 is axially moved by plunger 142), so as to move shift finger 102 into engagement with the slot 162 in bell crank lever 154. Rotation of shift finger 102 by motor 112 will then cause bell crank lever 154 to rotate, thereby causing shift finger 104 to move shift rail 72. Clockwise or counter-clockwise rotation of drive shaft 110 can thus be utilized to selectively engage the second or the third gears.

In a similar manner, shift finger 102 may be engaged with slot 162 in bell crank lever 156 to cause movement of shift finger 106, which is disposed within notch 76 of shift rail 74. As a result, synchromesh unit 46 can be controlled to cause selective engagement of the fourth and fifth gears.

Engagement of the various gears may be maintained in a known manner by means of detents built into the gear box. In the alternative, electric motor 112 may be utilized to hold the selected gear in engagement. However, in order to prevent wind back of electric motor 112, a continuous current may be required to be supplied to motor 112 while the gear is engaged, e.g., if a step motor is not utilized.

Figure 7:
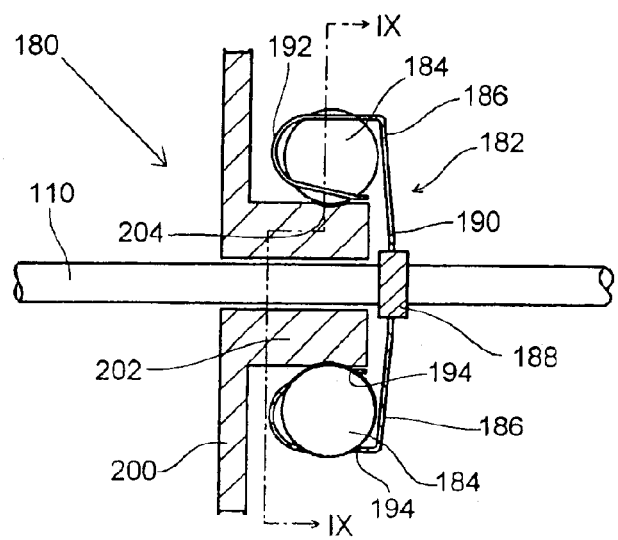
FIG. 7 is a cross-sectional, side elevation view along line VII—VII shown in FIG. 8, illustrating a modification of the representative gear engagement mechanism shown in FIG. 2.
Figure 8:
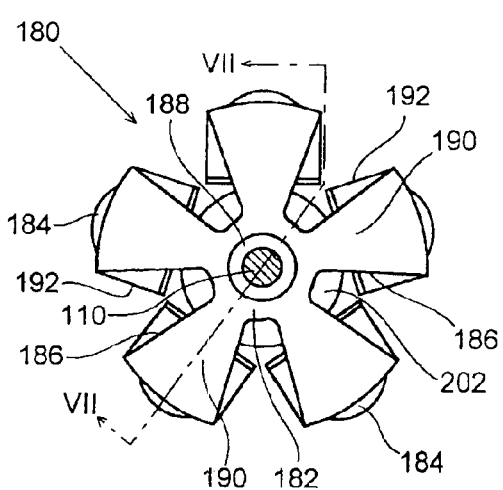
FIG. 8 shows an end elevation view of the modification illustrated in FIG. 7.
Figure 9:
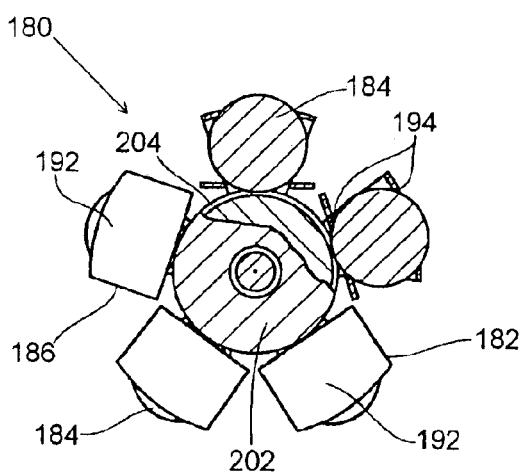
FIG. 9 is a partial, cross-sectional view along line IX-IX shown in FIG. 7.

According to a further embodiment of the present teachings, as illustrated in FIGS. 7–9, the need for continuously powering motor 112 may be avoided by providing brake mechanism 180 in the drive transmission path between motor 112 and drive shaft 110. Brake mechanism 180 may preferably include rotor 182, which may comprise a series or set of masses in the form of steel balls 184 that are mounted on resilient projections (fingers) 186. Projections 186 preferably extend in angularly spaced relationship from hub 188, which is (fixedly) mounted for rotation with drive shaft 110. Projections 186 may be made, e.g., of spring steel or a similar resilient material. Projections 186 preferably include respective radially-extending portions (projections) 190 and axially-extending U-shaped portions (flanges) 192. Apertures 194 are defined in the respective limbs of the U-shaped portion 192 for engaging or holding (supporting) steel balls 184. For example, steel balls 184 preferably may protrude through apertures 194 so as to securely and precisely locate the steel balls 184.

Stator 200 may include a static (stationary) annular plug 202 that surrounds drive shaft 110 and is disposed coaxially of rotor 182. Further, stator 200 is preferably disposed radially inside U-shaped portions 192 of projections 186. Shallow circumferential groove 204 may be defined in plug 202, which groove 204 preferably may have a substantially arcuate cross-section. Thus, when rotor 182 is stationary (i.e., not rotating), groove 204 is preferably resiliently engaged by the portions of steel balls 184 that protrude through apertures 194 defined in the inner limbs of U-shaped portions 192 of projections 186.

When drive shaft 110 and rotor 182 are stationary (i.e., not rotating relative to each other), the frictional engagement between steel balls 184 and plug 202 will be sufficient to prevent wind back of the electric motor 112 and will hold the selected gear in the engaged position. However, when motor 112 is energized to drive shaft 110, the centrifugal effect acting on steel balls 184 will cause steel balls 184 to move radially outwardly. This centrifugal effect is permitted due to the resilience of projections 186. The frictional engagement between rotor 182 and stator 200 will thereby diminish as the speed of motor 112 increases and the frictional engagement may be tuned or adjusted to reduce to zero at a predetermined rotational speed.

Thus, the present brake mechanism provides a useful device for selectively holding drive shaft 110 in a desired rotational position when motor 112 is not being operated, thereby reducing energy consumption of the gear engagement mechanism 100. By reliably holding the desired rotational position of drive shaft 110, the axial position of the selected shift rail 70, 72, 74 can be reliably held, thereby reliably holding the selected gear engagement.

While the representative brake mechanism 180 shown in FIGS. 7–9 may be advantageously utilized with the representative gear engagement mechanism shown in FIGS. 1–6, it may also be used for rotary drives of other gear engagement mechanisms or other mechanisms, e.g., motor driven clutch actuators.

While in the above embodiment steel balls are used, other forms of mass may be used. These masses may be secured or coupled to resilient fingers of the rotor in any suitable manner that will allow the masses to move radially outwardly when subjected to centrifugal forces. The present teachings are not particularly limited in this regard Additional teachings relevant to, and advantageously combinable with the present teachings, are found in U.S. Pat. Nos. 5,836,207 and 5,992,590, the contents of which are hereby incorporated by reference as if fully set forth herein.

What is claimed is:

1. An apparatus for selectively engaging one of a plurality of gears in a transmission, comprising:
   at least a first shift rail and a second shift rail, each being arranged and constructed such that movement of the respective shift rails in a first axial direction or second axial direction controls engagement of one of a pairs of gear,
   a rotatable drive shaft having a rotational axis,
   a first shift finger mounted on the drive shaft so as to be rotatable therewith about the rotational axis, and to be pivotable with respect to the drive shaft in a plane parallel to the rotational axis of the drive shaft,
   a second shift finger mounted on the drive shaft so as to be selectively rotatable therewith, wherein the second shift finger forms a first limb of a first bell crank lever (154), which first limb permanently engages the second shift rail, and the first bell crank lever also comprises a second limb, and wherein the first shift finger is pivotable in a first position so as selectively engage the first shift rail and the first shift finger is pivotable in a second position so as to selectively engage the second limb of the first bell crank lever, and
   means for pivoting the first shift finger.

2. An apparatus according to claim 1, wherein the rotational axis of the drive shaft is substantially perpendicular to the direction of the axial movement of the respective shift rails and the first and second shift fingers are rotatable in planes that are substantially parallel to direction of axial movement of the respective shift rails.

3. An apparatus according to claim 2, further comprising:
   at least a third shift rail and
   at least a second bell crank lever mounted on and selectively rotatable with the drive shaft, wherein a first limb of the second bell crank lever is permanently engaged with the third shift rail and a second limb of the second bell crank lever is spaced angularly of the second limb of the first bell crank lever when the shift rails are disposed in a neutral position, the first shift finger being selectively engageable with the second limb of the second bell crank lever in a third position.

4. An apparatus according to claim 3, wherein slots are defined in each of the respective second limbs of the first and second bell crank levers, the slots being arranged and constructed to be engageable by the first shift finger when pivoted to its engaged position from its disengaged position, and wherein the slots extend axially of the drive shaft so that, when engaged by the first shift finger, rotation of the first shift finger causes rotation of the respective bell crank lever.

5. An apparatus according to claim 4, further comprising a guide plate disposed in a fixed axial and rotational position between the engaged and disengaged positions of the first shift finger, the guide plate having apertures shaped to permit the first shift finger to move between the disengaged and engaged positions only when the first shift finger is accurately aligned with a notch in the first shift rail or with one slot of one of the bell crank levers.

6. An apparatus according to claim 5, further comprising:
   a hub fixedly defined on the drive shaft, the hub having an axially-extending diametrical slot, the first shift finger being-mounted in the diametrical slot for pivotal movement about a pivot pin, the axis of the pivot pin being transverse to the rotational axis of the drive shaft, the drive shaft passing through an elongated aperture defined in the first shift finger, and wherein the means for moving the first shift finger between the engaged and disengaged positions comprises:

a push rod coupled to the first shift finger so as to cause movement of the first shift finger between the engaged and disengaged positions, and means for moving the push rod.

7. An apparatus according to claim 6, wherein the push rod moving means comprises a solenoid actuator arranged and constructed to move the first shift finger between the disengaged and engaged positions.

8. An apparatus according to claim 7, wherein the solenoid actuator is mounted coaxially with the drive shaft.

9. An apparatus according to claim 8, wherein the push rod is slidably disposed within an axial bore defined in the drive shaft, an inner end of the push rod is pivotally connected to the first shift finger via a pivot pin, and the pivot pin extends transversely to the rotational axis of the drive shaft through an axially-extending diametrical slot.

10. An apparatus according to claim 9, wherein the first shift finger is normally biased towards the disengaged position.

11. An apparatus according to claim 10, further comprising an electric motor arranged and constructed to rotationally drive the drive shaft, the electric motor being coupled to the drive shaft via a gear train.

12. An apparatus according to claim 11, further comprising a reduction gearbox coupling the electric motor to the drive shaft.

13. An apparatus according to claim 10, further comprising a brake mechanism arranged and constructed to act upon the drive shaft so as to prevent rotation of the drive shaft when no torque is applied to the drive shaft.

14. An apparatus according to claim 13, wherein the brake mechanism comprises:

a rotor having a plurality of projections, the projections being spaced angularly of one another and each including a resilient, radially-extending portion and an axially-extending portion spaced radially of a rotational axis of the rotor, a mass coupled to each axially-extending portion, and a stator having an annular plug disposed coaxially of the rotor, wherein the stator, rotor and masses are arranged and constructed such that an external surface of the plug is frictionally engaged by the masses when the rotor is stationary, and such that when the rotational speed of the rotor exceeds a threshold value, frictional engagement between the stator and rotor reduces at least to substantially zero due to centrifugal loading of the masses.

15. An apparatus according to claim 1, further comprising:

a hub fixedly defined on the drive shaft, the hub having an axially-extending diametrical slot, the first shift finger being mounted in the diametrical slot for pivotal movement about a pivot pin, the axis of the pivot pin being transverse to the rotational axis of the drive shaft, and the drive shaft passing through an elongated aperture defined in the first shift finger, and wherein the means for moving the first shift finger between the engaged and disengaged positions comprises:

a push rod coupled to the first shift finger so as to cause movement of the first shift finger between the engaged and disengaged positions, and means for moving the push rod.

16. An apparatus according to claim 15, wherein the push rod moving means comprises a solenoid actuator arranged and constructed to move the first shift finger between the disengaged and engaged positions, the solenoid actuator is mounted coaxially with the drive shaft, the push rod is slidably disposed within an axial bore defined in the drive shaft, an inner end of the push rod is pivotally coupled to the first shift finger via a pivot pin, the pivot pin extends transversely to the rotational axis of the drive shaft through an axially-extending diametrical slot and the first shift finger is normally biased towards its disengaged position.

17. An apparatus according to claim 1, further comprising an electric motor arranged and constructed to rotatably drive the drive shaft.

18. An apparatus according to claim 17, wherein the electric motor is coupled to the drive shaft via a gear train.

19. An apparatus according to claim 18, further comprising a reduction gearbox coupling the electric motor to the drive shaft.

20. An apparatus according to claim 1, further comprising a brake mechanism arranged and constructed to act upon the drive shaft so as to prevent rotation of the drive shaft when no torque is being applied to the drive shaft.

21. An apparatus according to claim 20, wherein the brake mechanism comprises:

a rotor having a plurality of projections, the projections being spaced angularly of one another and each including a resilient, radially-extending portion and an axially-extending portion spaced radially of the rotational axis of the rotor, a mass coupled to each axially-extending portion, and a stator having an annular plug disposed coaxially of the rotor, wherein the stator, rotor and masses are arranged and constructed such that an external surface of the plug is frictionally engaged by the masses when the rotor is stationary, and such that when the rotational speed of the rotor exceeds a threshold value, frictional engagement between the stator and rotor reduces at least to substantially zero due to centrifugal loading of the masses.

22. An apparatus according to claim 21, wherein the axially-extending portions of the projections are U-shaped, apertures are defined in the inner and outer limbs of the U-shaped portions, the masses are steel balls and the apertures are arranged and constructed to securely locate the steel balls.

23. An apparatus according to claim 22, wherein the steel balls protrude through the apertures in the inner limbs of U-shaped portions, a shallow arcuate circumferential groove is defined in the stator, and the groove is arranged and constructed to be frictionally engaged by the steel balls when the rotor is stationary.

* * * * *